United States Patent [19]

Sybert

[11] Patent Number: 5,011,899

[45] Date of Patent: Apr. 30, 1991

[54] COPOLY(AROMATIC SULFONE CARBONATE - AROMATIC ALKYLCARBONATE) - POLYSILOXANE BLOCK COPOLYMER

[75] Inventor: Paul D. Sybert, Pittsfield, Mass.

[73] Assignee: General Electric Company, Pittsfield, Mass.

[21] Appl. No.: 394,710

[22] Filed: Aug. 15, 1989

[51] Int. Cl.$^5$ .............................................. C08G 77/04
[52] U.S. Cl. ........................................ 528/26; 528/29; 528/43; 528/30; 525/474
[58] Field of Search ................. 528/26, 29, 43, 30; 525/474

[56] References Cited

U.S. PATENT DOCUMENTS

| | | |
|---|---|---|
| 3,189,662 | 6/1965 | Vaughn, Jr. .................. 260/824 |
| 4,027,072 | 5/1977 | Molari, Jr. .................. 428/412 |
| 4,123,588 | 10/1978 | Molari, Jr. .................. 428/412 |
| 4,594,404 | 6/1986 | Kawakami et al. ............ 528/174 |
| 4,647,642 | 3/1987 | Laval et al. .................. 528/25 |
| 4,681,922 | 7/1987 | Schmidt et al. ............... 528/29 |
| 4,735,999 | 4/1988 | Patterson et al. ............. 525/431 |
| 4,912,165 | 3/1990 | Winfried et al. .............. 525/474 |

*Primary Examiner*—Melvyn I. Marquis
*Attorney, Agent, or Firm*—Spencer D. Conard; William F. Mufatti

[57] ABSTRACT

Polysulfonecarbonate-siloxane block copolymers provide ductile resins having high heat distortion temperatures and high glass transition temperatures. The polysulfonecarbonate-siloxane block copolymers are useful as molding compounds.

10 Claims, No Drawings

COPOLY(AROMATIC SULFONE CARBONATE - AROMATIC ALKYLCARBONATE) - POLYSILOXANE BLOCK COPOLYMER

BACKGROUND OF THE INVENTION

1. Field of the Invention

The present invention relates to copoly(aromatic sulfone carbonate-aromatic alkylcarbonate)-polysiloxane block copolymer, and more particularly relates to copoly(aromatic sulfone carbonate-aromatic alkylcarbonate)-polysiloxane block copolymer having high glass transition temperatures.

2. Description of Related Art

Organopolysiloxane-polycarbonate block copolymers are well known in the art. See, for example, U.S. Pat. Nos. 3,189,662; 4,027,072; and 4,123,588; all of which are incorporated herein by reference. While these copolymers are useful as flexible thermoplastics, thermoplastic elastomers and adhesive layers for laminates, they have lower glass transition temperatures than are desired for some applications.

Polyarylsulfone carbonates derived from bis-(3,5-dimethyl-4-hydroxyphenylsulfone), 2,2-bis(4-hydroxyphenylpropane) and phosgene are also known but they are generally too brittle to be employed in applications requiring flexibility and a degree of elasticity.

Accordingly, one object of the present invention is to provide copolymers having the combined properties of suitably high glass transition temperatures and flexibility.

SUMMARY OF THE INVENTION

The present invention involves copoly(aromatic sulfone carbonate-aromatic alkylcarbonate)-polysiloxane block copolymers obtained from the reaction products of bis-(3,5-dimethyl-4-hydroxyphenyl)sulfone, a dihydric phenol such as 2,2-bis(4-hydroxyphenyl)propane (Bisphenol A), a siloxane oligomer end capped with a bisphenol, and phosgene. The block copolymers exhibit high glass transition temperatures and are useful in applications such as wire coatings where flexibility and high use temperatures are desired.

DETAILED DESCRIPTION OF THE INVENTION

The present invention involves copoly(aromatic sulfone carbonate-aromatic alkylcarbonate)-polysiloxane block copolymers. The copolymers are derived from the reaction products of (i) bis-(3,5-dimethyl-4-hydroxyphenyl)sulfone, (ii) a dihydric phenol such as 2,2-bis-(4-hydroxyphenyl)-propane (Bisphenol A), (iii) a siloxane compound, and (iv) a carbonate precursor.

The bis-(3,5-dimethyl-4-hydroxyphenyl)sulfone can be represented by the following formula:

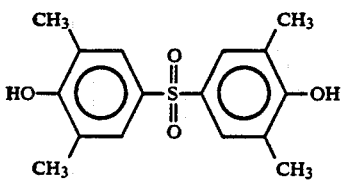
(I)

Bis-(3,5-dimethyl-4-hydroxyphenyl)sulfone available commercially.

The dihydric phenols have the formula:

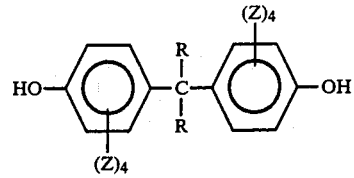
(II)

wherein R is a member selected from the class of hydrogen, monovalent hydrocarbon radicals and halogenated monovalent hydrocarbon radicals and Z is a member selected from the class of hydrogen, lower alkyl radicals and halogen radicals and mixtures thereof.

Included within the radicals represented by R of Formula II are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloalkyl, haloalkyl including methyl, ethyl, propyl, chlorobutyl, cyclohexyl, etc.; R can be all the same radical or any two or more of the aforementioned radicals, while R is preferably methyl, hydrogen, methyl, ethyl, propyl, chloro, bromo, iodo, etc. and combinations thereof, and Z is preferably hydrogen. The preferred dihydric phenol is 2,2-bis-(4-hydroxyphenyl)propane (Bisphenol A).

The preferred siloxane compound is a siloxane polymer end capped with a bisphenol and has the general formula:

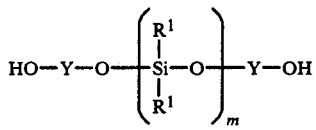
(III)

wherein m has an average value of from about 5 to about 90, more preferably from 10 to 50, and most preferably about 30, and wherein each $R^1$ is independently selected from the class of monovalent hydrocarbon radicals and halogenated hydrocarbon radicals, and $R^1$ is preferably methyl. $R^1$ also includes cyanoalkyl radicals such as cyanoethyl, cyanobutyl, etc., radicals, and where Y is a divalent radical that can be represented by the general formula:

(IV)

wherein:
$R^2$ is independently selected from halogen, monovalent hydrocarbon, and monovalent hydrocarbonoxy radicals;
$R^3$ is independently selected from halogen, monovalent hydrocarbon, and monovalent hydrocarbonoxy radicals;
W is selected from divalent hydrocarbon radicals,

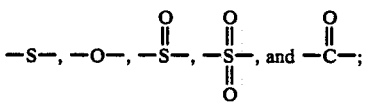

$n^2$ and $n^3$ are independently selected, from integers having a value of from 0 to 4 inclusive;
and b is either zero or one.

The monovalent hydrocarbon radicals represented by $R^2$ and $R^3$ include the alkyl, cycloalkyl, aryl, aralkyl and alkaryl radicals. The preferred alkyl radicals are those containing from 1 to about 12 carbon atoms. The preferred cycloalkyl radicals contain from 4 to about 8 ring carbon atoms. The preferred aryl radicals contain from 6 to 12 ring carbon atoms, i.e., phenyl, naphthyl and biphenyl. The preferred aralkyl and alkaryl radicals contain from 7 to about 14 carbon atoms.

The preferred halogen radicals represented by $R^2$ and $R^3$ are chlorine and bromine.

The divalent hydrocarbon radicals represented by W include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those that contain from 6 to 16 ring carbon atoms.

The monovalent hydrocarbonoxy radicals represented by $R^2$ and $R^3$ may be represented by the formula —$OR^3$ wherein $R^3$ is a monovalent hydrocarbon radical of the type described hereinafore. Preferred monovalent hydrocarbonoxy radicals are the alkoxy and aryloxy radicals.

Some illustrative non-limiting examples of dihydric phenols include:
2,2-bis(4-hydroxyphenyl)propane (bisphenol A);
2,2-bis(3,5-dibromo-4-hydroxy-phenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4'-thiodiphenol; and
bis(4-hydroxyphenyl)ether.

Other dihydric phenols which are useful are described in U.S. Pat. Nos. 2,998,835; 3,028,365 and 3,334,154; all of which are incorporated herein by reference.

Preferably Y is the divalent radical of bisphenol A, which can be represented by the formula:

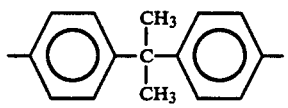 (V)

The carbonate precursor may be a carbonyl halide, a carbonate ester, or a bishaloformate. The carbonyl halides may be carbonyl bromide, carbonyl chloride, or mixtures thereof. The carbonate esters may be diphenyl carbonate; di(halophenyl)carbonates such as di(bromophenyl)carbonate, di(chlorophenyl)-carbonate and di(tribromophenyl)carbonate; di(alkyl-phenyl)carbonates such as di(tolyl)carbonate; di(naphthyl)carbonate, chlorophenyl chloronaphthyl carbonate; and phenyl tolyl carbonate. The bishaloformates that can be used include the bishaloformates of dihydric phenols such as the bischloroformates of bisphenol A and hydroquinone; and bishaloformates of glycols such as the bischloroformates of ethylene glycol, neopentyl glycol and polyethylene glycol. The preferred carbonate precursor is carbonyl chloride, also known as phosgene.

The siloxane compound may also be a linked siloxane polymer endcapped with a bisphenol and can be represented by the general formula:

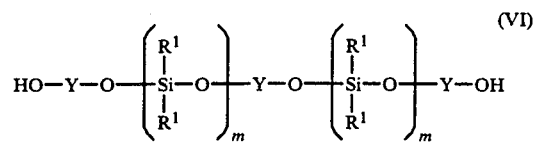 (VI)

The copoly(aromatic sulfone carbonate-aromatic alkylcarbonate)-polysiloxane block copolymers have first block and second blocks. The first blocks are copolysulfonecarbonate-aromatic polycarbonate blocks and have first units that may be represented by the formula:

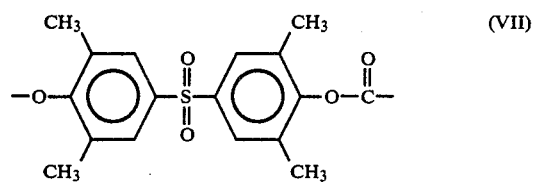 (VII)

and second units that may be represented by the formula:

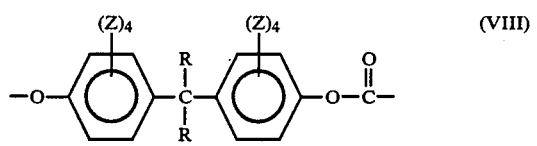 (VIII)

wherein Z and R are as defined above. The second blocks are endcapped polysiloxanes and may be represented by the general formula:

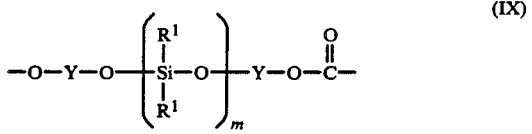 (IX)

wherein $R^1$ and m are defined as above. The second blocks may also be linked, endcapped polysiloxanes represented by the general formula:

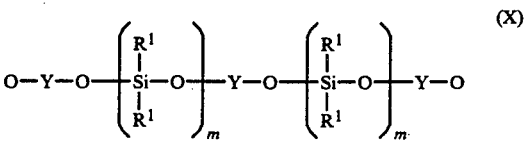 (X)

wherein Y, $R^1$ and m are defined as above. The second blocks contain polysiloxane moieties represented by the formula:

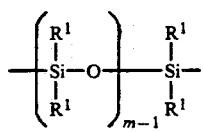  (XI)

The block copolymers preferably contain from 5 to 85 weight percent siloxane moieties based on the total weight of the copolymers; more preferably from 5% to 60% by weight thereof; and most preferably about 40% by weight thereof.

The first blocks are preferably present in the copolymers at a level of from 10% to 94% by weight based on the total weight of the copolymers; more preferably at a level of from 30% to 94% by weight thereof; and most preferably at a level of about 50% by weight thereof. The second blocks are preferably present in the copolymers at a level of from 6% to 90% by weight based on the total weight of the copolymers; more preferably at a level of from 6% to 70% by weight thereof; and most preferably at a level of about 50% by weight thereof.

The first units are preferably present in the first blocks at a level of from 5% to 85% by weight based on the total weight of the first blocks; more preferably at a level of from 40% to 70% by weight thereof, and most preferably at a level of about 65% by weight thereof. The second units are preferably present in the first blocks at a level of from 15% to 95% by weight based on the total weight of the first blocks; more preferably at a level of 30% to 60% by weight thereof; and most preferably at a level of about 35% by weight thereof.

The preferred copoly(aromatic sulfone carbonate-aromatic alkylcarbonate)-polysiloxane block copolymers have first blocks which have first units of the formula:

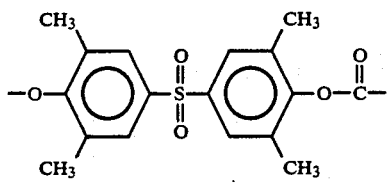  (XII)

and second units of the formula:

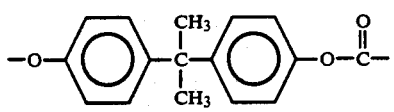  (XIII)

and second blocks of the formula:

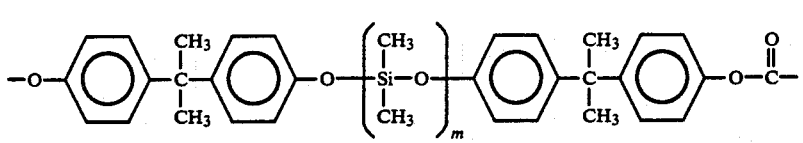  (XIV)

wherein m has an average value of from 5 to 90, more preferably from 10 to 50 and more preferably m has an average value of about 30.

The preferred polysulfonecarbonate-siloxane block copolymers can be obtained from the reaction products of:

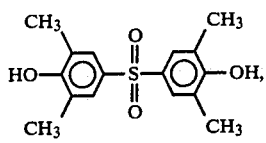  (XV)

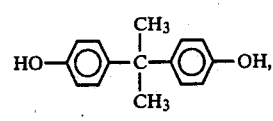  (XVI)

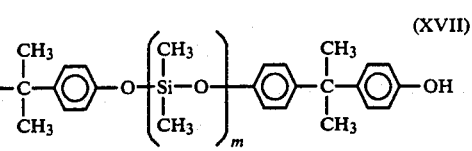  (XVII)

and a carbonate precursor, preferably phosgene,

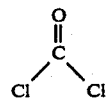  (XVIII)

The process of the present invention involves reacting the bis-(3,5-dimethyl-4-hydroxyphenyl)-sulfone, dihydric phenol, and silicone compound with phosgene in an interfacial process involving water, methylene chloride and sodium hydroxide.

Preferably, the combined total moles of bis-(3,5-dimethyl-4-hydroxyphenyl)sulfone, dihydric phenol and siloxane compounds are reacted with a substantially equal number of moles of carbonate precursor. Preferably, siloxane compound is reacted at a level of from 6% to 90% by weight based on the total reacted weight of bis-(3,5-dimethyl-4-hydroxyphenyl)sulfone, dihydric phenol, and siloxane compound; more preferably from 6% to 70% by weight thereof; and most preferably about 50% by weight thereof.

Preferably the bis-(3,5-dimethyl-4-hydroxyphenyl)-sulfone is reacted at a level of from 6% to 90% by weight based on the total reacted weight of bis-(3,5-dimethyl-4-hydroxyphenyl)sulfone, dihydric phenol and siloxane compound; more preferably 44% to 27% by weight thereof; and most preferably about 39% by weight thereof. Preferably the dihydric phenol is reacted at a level of from 2% to 88% by weight based on the total reacted weight of bis-(3,5-dimethyl-4-hydroxyphenyl)sulfone, dihydric phenol and siloxane compound; more preferably from 3% to 49% by weight thereof; and most preferably about 11% by weight thereof.

The siloxane compounds can be obtained by end capping a chain-stopped polydiorganosiloxane having the formula:

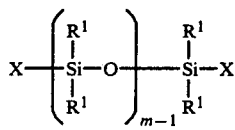

with an end capping monomer of the formula:

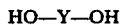

$R^1$ and Y are defined as above. End capping for halogen chain-stopped polydiorganosiloxanes involves the reaction of a halogen chain-stopped polyorganosiloxane with a dihydric phenol and an acid scavenger (such as triethylamine or $NH_3$ in a non-protic solvent. X is a halogen or other reactive endgroup such as acetate or an amine. Preferably X is a halogen radical, more preferably chloro. The halogen stopped polydiorganosiloxanes can be made by conventional procedures such as by the controlled hydrolysis of a diorganodihalosilane, for example, dimethyldichlorosilane as taught in Patnode, U.S. Pat. No. 2,381,366 and Hyde, U.S. Pat. Nos. 2,629,726 and 2,902,507 which are incorporated herein by reference.

The polysulfonecarbonate-siloxane block copolymers can be obtained by an interfacial process.

The interfacial polymerization process utilizes two different solvent media which are immiscible. One solvent medium is an aqueous basic medium. The other solvent medium is an organic medium, such as methylene chloride, which is immiscible in said aqueous medium. Also employed in the interfacial polymerization process are molecular weight regulators which control the chain length or molecular weight of the carbonate polymer by a chain terminating mechanism, and catalysts. The molecular weight regulators are well known in the art and include, but are not limited to, phenol itself, p-tertiarybutyl phenol, and chroman-I. The catalysts are also well known in the art and include, but are not limited to, tertiary amines such as triethylamine. A suitable interfacial process involves reacting bis-(3,5-dimethyl-4-hydroxyphenyl)sulfone, the dihydric phenol such as bisphenol A, the siloxane compound and phosgene using a basic aqueous phase (Na OH and $H_2O$) and a methylene chloride phase.

Preferably the combined total moles of bis-(3,5-dimethyl-4-hydroxyphenyl)sulfone, dihydric phenol and siloxane compound are reacted with an approximately equal mole amount of carbonate precursor.

EXAMPLES

The following examples illustrate the present invention but are not meant to limit the scope thereof.

EXAMPLE 1

As described below, a bis-(3,5-dimethyl-4-hydroxyphenyl)sulfone, bisphenol A, siloxane block copolymer was prepared employing bis-(3,5-dimethyl-4-hydroxyphenyl)sulfone and bisphenol A in a mol ratio of 60/40 and employing 40 weight percent siloxane based on the total weight of block copolymer formed. The siloxane block had an average number of repeating units (DP) of about 30 (N=30). Note in Table 1 that the present copolymer has a substantially higher glass transition temperature (TG) than that of the polycarbonate siloxane of comparative example 1 (Table 2).

Step 1

A mixture of 68.00 gms (0.2220 mol) of bis-(3,5-dimethyl-4-hydroxyphenyl)sulfone in 400 ml of water and 310 ml of methylene chloride was phosgenated (65.9 gms, 0.666 mol) at ph 11.0.

Step 2

After the excess phosgene dissipated the following was added: a methylene chloride solution containing 76.8 gms (0.02850 mol) of BPA capped siloxane fluid (DP 30), BPA (18.4 gms), (0.0806 mol), p-cumylphenol (0.393 gms, 0.379 mol), 70 ml of water, and 267 ml (including that added with the siloxane fluid) of methylene chloride. Then 5.5 ml of triethylamine were added, and the mixture was stirred at pH 10.0 for 15 min. The organic layer was separated, washed with dilute HCl, washed water until no chloride was detected with dilute $AgNO_3$, and precipitated into boiling water.

EXAMPLE 2

As described below, a bis-(3,5-dimethyl-4-hydroxyphenyl)sulfone, bisphenol A, siloxane block copolymer was prepared employing bis-(3,5-dimethyl-4-hydroxyphenyl)sulfone and bisphenol A in a mol ratio of 60/40 and employing 40 weight percent siloxane based on the total weight of block copolymer formed. The siloxane block had an average number of repeating units (DP) of about 87 (N=87). Note in Table 1 that the present copolymer has a substantially higher glass transition temperature (TG) than that of the polycarbonate siloxane of comparative example 2 of Table 2.

Step 1

A mixture of 66.00 gms (0.2220 mol) of bis-(3,5-dimethyl-4-hydroxyphenyl)sulfone in 400 ml of water and 310 ml of methylene chloride was phosgenated (65.9 gms, 0.666 mol) at ph 11.0.

Step 2

After the excess phosgene dissipated the following was added: a methylene chloride solution containing 80.0 gms (0.01271 mol) of BPA capped siloxane fluid (DP 78), BPA (28.50 gms), (0.1248 mol), p-cumylphenol (2.357 gms, 0.01110 mol), 60 ml of water, and 305 ml (including that added with the siloxane fluid) of methylene chloride. Then 5.5 ml of triethylamine were added, and the mixture was stirred at pH 10.0 for 15 min. The solution was then phosgenated for 15 min. at 1 gm/min. at pH 11.0 to 11.5. The organic layer was separated, washed with dilute HCl, washed water until no chloride was detected with dilute $AgNO_3$, and precipitated into boiling water.

EXAMPLE 3

As described below, a bis-(3,5-dimethyl-4-hydroxyphenyl)sulfone, bisphenol A, siloxane block copolymer was prepared employing bis-(3,5-dimethyl-4-hydroxyphenyl)sulfone and bisphenol A in a mol ratio of 60/40 and employing 60 weight percent siloxane based on the total weight of block copolymer formed. The siloxane block had an average number of repeating units (DP) of about 30 (N=30). Note in Table 1 that the present copolymer has a substantially higher glass transition temperature (TG) than that of the polycarbonate siloxane of comparative example 3 of Table 2.

Step 1

A mixture of 35.00 gms (0.1143 mol) of bis-(3,5-dimethyl-4-hydroxyphenyl)sulfone in 200 ml of water and 160 ml of methylene chloride was phosgenated (33.9 gms, 0.343 mol) at ph 11.0.

Step 2

After the excess phosgene dissipated the following was added: a methylene chloride solution containing 103.4 gms (0.03833 mol) of BPA capped siloxane fluid (DP 30), BPA (7.86 gms, 0.0344 mol), p-cumylphenol (0.000 gms, 0.000 mol), 200 ml of water, and 277 ml (including that added with the siloxane fluid) of methylene chloride. Then 4.1 ml of triethylamine were added, and the mixture was stirred at pH 10.0 for 15 min. The solution was then phosgenated for 5 min. at 1 gm/min. at pH 11.0 to 11.5. The organic layer was separated, washed with dilute HCl, washed water until no chloride was detected with dilute AgNO3, and precipitated into boiling water.

EXAMPLE 4

As described below, a bis-(3,5-dimethyl-4-hydroxyphenyl)sulfone, bisphenol A, siloxane block copolymer was prepared employing bis-(3,5-dimethyl-4-hydroxyphenyl)sulfone and bisphenol A in a mol ratio of 65/35 and employing 5 weight percent siloxane based on the total weight of block copolymer formed. The siloxane block had an average number of repeating units (DP) of about 30 (N=30). Note in Table 1 that the present copolymer has a substantially higher glass transition temperature (TG) than that of the polycarbonate siloxane of comparative example 4 of Table 2.

Step 1

A mixture of 68.00 gms (0.2220 mol) of bis-(3,5-dimethyl-4-hydroxyphenyl)sulfone in 400 ml of water and 310 ml of methylene chloride was phosgenated (65.9 gms, 0.666 mol) at pH 11.0.

Step 2

After the excess phosgene dissipated the following was added: a methylene chloride solution containing 6.5 gms (0.00241 mol) of BPA capped siloxane fluid (DP 30), BPA (26.19 gms, 0.1147 mol), p-cumylphenol (2.538 gms, 0.01195 mol), 60 ml of water, and 78 ml (including that added with the siloxane fluid) of methylene chloride. Then 3.74 ml (0.0268 mol) of triethylamine were added, and the mixture was stirred at pH 10.0 for 15 min. The solution was then phosgenated for 15 min. at 1 gm/min. ag pH 11.0 to 11.5. The organic layer was separated, washed with dilute HCl, washed water until no chloride was detected with dilute AgNO3, and precipitated into boiling water. The resultant polymer was dried in an air oven at 130° C.

COMPARATIVE EXAMPLES

The BPA polycarbonate siloxane block copolymers were prepared using standard interfacial conditions. The Tgs and IVs are listed in Table 2. The preparation of the block copolymer containing 60 weight percent siloxane with an average DP of 30 in the siloxane block is given as an example.

To a solution of 2093 gms (0.9728 mol) of the BPA terminated siloxane (siloxane DP 30), 536.8 gms (2.351 mol) of BPA, 7.59 gms (0.036 mol) of p-cumylphenol, 47 mL of triethylamine, 5.6 L of water and 9 L of methylene chloride was added 720 gms of phosgene while the pH was maintained at 9.5 to 11.5. The organic layer was separated and washed with dilute acid followed by DI water. The product was isolated by steam precipitation. The polymer had an IV= to 0.66 dL/gm in chloroform at 25° C. and a Tg of 95° C.

TABLE 1

Glass Transition Temperatures of Copoly(bis-(3,5-dimethyl-4-hydroxyphenyl)sulfone-BPA)Carbonate-Polysiloxane Block Copolymers

| Example | Mol % BPA | Mol % DXS | Wt % Siloxane | N | IV | TG (C) |
|---|---|---|---|---|---|---|
| 1 | 40 | 60 | 40 | 30 | 0.75 | 192 |
| 2 | 40 | 60 | 40 | 87 | 0.58 | 207 |
| 3 | 40 | 60 | 60 | 30 | 1.7 | 172 |
| 4 | 35 | 65 | 5 | 30 | 0.3 | 208 |

TABLE 2

Glass Transition Temperatures of BPA Carbonate - Polysiloxane Block Copolymers

| Comparative Example | Wt % Siloxane | N | IV | TG (C) |
|---|---|---|---|---|
| 1 | 43 | 30 | 0.68 | 120 |
| 2 | 43 | 87 | 0.6 | 145 |
| 3 | 60 | 30 | 0.66 | 95 |
| 4 | 5 | 30 | 0.47 | 142 |

What is claimed:

1. A polysulfonecarbonate-siloxane block copolymer derived from the reaction products of:
   (a) bis-(3,5-dimethyl-4-hydroxyphenyl)sulfone;
   (b) a dihydric phenol represented by the formula:

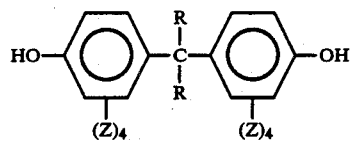

wherein each R is independently selected from the group consisting of hydrogen, monovalent hydrocarbon radicals and halogenated hydrocarbon radicals, each Z being independently selected from the group consisting of hydrogen, lower alkyl radicals and halogen radicals;

(c) a siloxane compound represented by the formula:

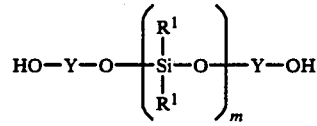

wherein m is on average from 5 to 90, each $R^1$ is independently selected from the group consisting of monovalent hydrocarbon radicals, halogenated hydrocarbon radicals and cyanoalkyl radicals, Y is represented by the formula:

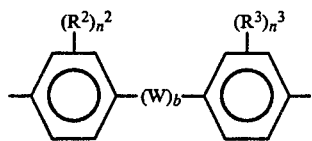

wherein $R^2$ is independently selected from the group consisting of halogen, monovalent hydrocarbon, and monovalent hydrocarbonoxy radicals; $R^3$ is independently selected from the group consisting of halogen, monovalent hydrocarbon, and monovalent hydrocarbonoxy radicals; W is selected from the group consisting of divalent hydrocarbon radicals,

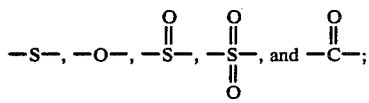

$n^2$ and $n^3$ are independently selected from the group consisting of integers having a value of from 0 to 4 inclusive; and b is either 0 or 1; and
(d) a carbonate precursor.

2. The polysulfonecarbonate-siloxane block copolymer of claim 1 wherein the carbonate precursor is phosgene.

3. The polysulfonecarbonate-siloxane block copolymer of claim 1 wherein the siloxane compound is present at a level of from 55% to 85% by weight based on the total weight of copolymer obtained.

4. A polysulfonecarbonate-siloxane block copolymer comprising:
(a) first blocks having:
(i) first units represented by the formula:

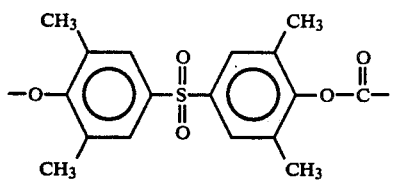

and
(ii) second units that may be represented by the formula:

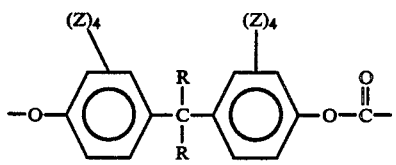

wherein each Z is independently selected from the group consisting of hydrogen, lower alkyl radicals and halogen radicals; each R being independently selected from the group consisting of hydrogen, monovalent hydrocarbon radicals and halogenated hydrocarbon radicals; and
(b) second blocks represented by the formula:

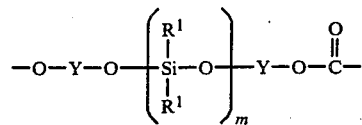

wherein Y is a divalent radical of a dihydric phenol and $R^1$ is independently selected from the group consisting of monovalent hydrocarbon radicals, halogenated hydrocarbon radicals and cyanoalkyl radicals, and m being on average from 5 to 90.

5. A copolymer comprising the reaction products of:
(a) bis-(3,5-dimethyl-4-hydroxyphenyl)sulfone;
(b) a dihydric phenol represented by the formula:

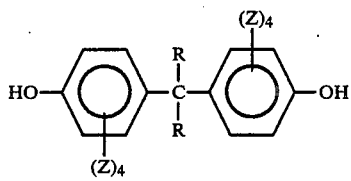

wherein each R is independently selected from the group consisting of hydrogen, monovalent hydrocarbon radicals and halogenated hydrocarbon radicals, each Z being independently selected from the group consisting of hydrogen, lower alkyl radicals and halogen radicals;
(c) a siloxane compound derived from the reaction products of a polydiorgano- siloxane and a bisphenol monomer, said polydiorganosiloxane being represented by the formula:

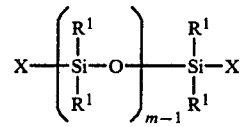

wherein X is selected from the group consisting of halogens, amines and acetates, each $R^1$ is independently selected from the group consisting of monovalent hydrocarbon radicals and halogenated hydrocarbon radicals, m having an average value of from 5 to 90, said bisphenol monomer being represented by the formula:

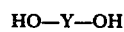

HO—Y—OH wherein Y is represented by the general formula:

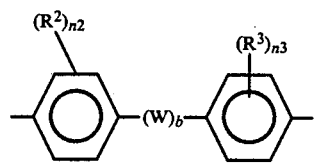

wherein $R^2$ is independently selected from the group consisting of halogen, monovalent hydrocarbon, and monovalent hydrocarbonoxy radicals; $R^3$ being independently selected from halogen, monovalent hydrocarbon, and monovalent hydrocarbonoxy radicals, W being selected from divalent hydrocarbon radicals,

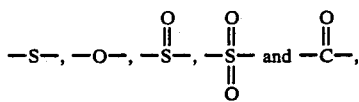

and $n^2$ and $n^3$ being independently selected from integers having a value of from 0 to 4 inclusive, and b being selected from 0 to 1; and (d) a carbonate precursor.

6. The copolymer of claim 5 wherein said copolymer comprises polysiloxane moieties represented by the formula:

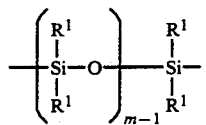

present at a level of from 5% to 85% by weight based on the total weight of the copolymer.

7. The copolymer of claim 5 wherein said dihydric phenol is 2,2-bis-(4-hydroxyphenyl)propane, said X being chlorine, said bisphenol monomer being 2,2-bis-(4-hydroxyphenyl)propane, said carbonate precursor being phosgene.

8. A copolymer consisting essentially of the reaction products of:

(a) bis-(3,5-dimethyl-4-hydroxyphenyl)sulfone;

(b) a dihydric phenol represented by the formula:

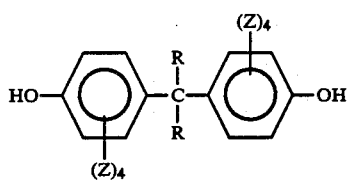

wherein each R is independently selected from the group consisting of hydrogen, monovalent hydrocarbon radicals and halogenated hydrocarbon radicals, each Z being independently selected from the class of hydrogen, lower alkyl radicals and halogen radicals;

(c) a siloxane compound derived from the reaction products of a polydiorgano- siloxane and a bisphenol monomer, said polydiorganosiloxane being represented by the formula:

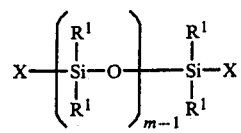

wherein X is a halogen, each $R^1$ is independently selected from the group consisting of monovalent hydrocarbon radicals and halogenated hydrocarbon radicals, m having an average value of from 5 to 90, said bisphenol monomer being represented by the formula:

HO—Y—OH wherein Y is represented by the general formula:

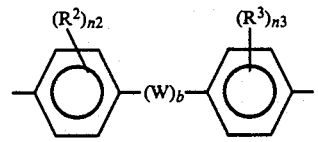

wherein $R^2$ is independently selected from the group consisting of halogen, monovalent hydrocarbon, and monovalent hydrocarbonoxy radicals; $R^3$ being independently selected from the group consisting of halogen, monovalent hydrocarbon, and monovalent hydrocarbonoxy radicals, W being selected from divalent hydrocarbon radicals,

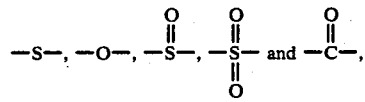

and $n^2$ and $n^3$ being independently selected from the group consisting of integers having a value of from 0 to 4 inclusive, and b being selected from 0 to 1; and (d) a carbonate precursor.

9. The copolymer of claim 8 wherein said copolymer comprises polysiloxane moieties represented by the formula:

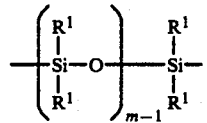

present at a level of from 5% to 85% by weight based on the total weight of the copolymer.

10. The copolymer of claim 8 wherein said dihydric phenol is 2,2-bis-(4-hydroxyphenyl)propane, said X being chlorine, said bisphenol monomer being 2,2-bis-(4-hydroxyphenyl)propane, said carbonate precursor being phosgene.

* * * * *